(12) United States Patent
Bielak

(10) Patent No.: US 12,078,223 B2
(45) Date of Patent: Sep. 3, 2024

(54) HYDRAULIC REBOUND STOP FOR MONOTUBE DAMPER

(71) Applicant: BeijingWest Industries Co., Ltd., Beijing (CN)

(72) Inventor: Roman Bielak, Cracow (PL)

(73) Assignee: BeijingWest Industries Co., Ltd., Beijing (CN)

( * ) Notice: Subject to any disclaimer, the term of this patent is extended or adjusted under 35 U.S.C. 154(b) by 0 days.

(21) Appl. No.: 17/716,710

(22) Filed: Apr. 8, 2022

(65) Prior Publication Data
US 2023/0250858 A1    Aug. 10, 2023

(30) Foreign Application Priority Data
Feb. 8, 2022    (CN) .......................... 202210117424.0

(51) Int. Cl.
| | |
|---|---|
| *F16F 9/49* | (2006.01) |
| *F16F 9/19* | (2006.01) |
| *F16F 9/36* | (2006.01) |

(52) U.S. Cl.
CPC .................. *F16F 9/49* (2013.01); *F16F 9/19* (2013.01); *F16F 9/362* (2013.01); *F16F 2230/0005* (2013.01)

(58) Field of Classification Search
CPC ...... F16F 9/49; F16F 9/19; F16F 9/362; F16F 9/483; F16F 2230/0005
See application file for complete search history.

(56) References Cited

U.S. PATENT DOCUMENTS

| | | | | |
|---|---|---|---|---|
| 3,175,645 A | * | 3/1965 | Schafer | ..................... F16F 9/49 |
| | | | | 188/282.6 |
| 5,706,920 A | | 1/1998 | Pees et al. | |

(Continued)

FOREIGN PATENT DOCUMENTS

| | | |
|---|---|---|
| CN | 203906638 U | 10/2014 |
| CN | 106122344 A | 11/2016 |

(Continued)

OTHER PUBLICATIONS

Extended European Search Report issued on Jun. 30, 2023 for counterpart European patent application No. 23154470.1.

(Continued)

*Primary Examiner* — Thomas W Irvin
(74) *Attorney, Agent, or Firm* — William H. Honaker; Dickinson Wright PLLC

(57) ABSTRACT

A monotube damper assembly includes a housing defining a main compartment extending along a center axis between a first end and a second end; and a hydraulic rebound stop (HRS) assembly disposed within the housing adjacent to the first end and including an HRS sleeve having a tubular portion and a flange portion extending radially outwardly from the tubular portion at a first axial end thereof and configured to engage a corresponding ledge for locating the HRS assembly in the main compartment and preventing the HRS assembly from moving toward the second end, the tubular portion defining a plurality of recesses each extending axially from a second axial end of the tubular portion opposite the first axial end and having a depth that gradually decreases along a length of the tubular portion toward the flange portion An HRS assembly for a monotube damper assembly is also provided.

19 Claims, 5 Drawing Sheets

(56) References Cited

U.S. PATENT DOCUMENTS

| | | | |
|---|---|---|---|
| 7,441,640 B2* | 10/2008 | Russell | F16F 9/466 188/289 |
| 7,458,314 B2* | 12/2008 | Asa | F16F 9/0218 92/168 |
| 9,593,697 B2 | 3/2017 | Baalmann et al. | |
| 9,605,726 B2* | 3/2017 | Baldoni | F16F 9/49 |
| 9,657,803 B2* | 5/2017 | Slusarczyk | B21D 22/20 |
| 10,107,351 B2 | 10/2018 | Chyla et al. | |
| 10,107,352 B2* | 10/2018 | Grzesik | F16F 9/585 |
| 10,174,802 B2 | 1/2019 | Osika et al. | |
| 10,527,122 B2* | 1/2020 | Kus | F16F 9/49 |
| 10,533,624 B2* | 1/2020 | Ishimaru | F16F 9/49 |
| 11,187,298 B2* | 11/2021 | Mallin | F16F 9/49 |
| 11,268,589 B2* | 3/2022 | Zimmer | F16F 9/348 |
| 11,320,017 B2* | 5/2022 | Bielak | F16F 9/585 |
| 11,543,000 B2* | 1/2023 | Kontny | F16F 9/49 |
| 11,585,401 B2* | 2/2023 | Bergesio | F16F 9/3207 |
| 2003/0015382 A1 | 1/2003 | Lun | |
| 2005/0077131 A1* | 4/2005 | Russell | F16F 9/49 188/314 |
| 2006/0016650 A1* | 1/2006 | Kneip | F16F 9/0227 267/64.11 |
| 2007/0187199 A1* | 8/2007 | Asa | F16F 9/362 188/322.16 |
| 2012/0090931 A1* | 4/2012 | Krazewski | F16F 9/3465 188/288 |
| 2015/0090548 A1* | 4/2015 | Yamanaka | F16F 9/3271 29/434 |
| 2015/0330475 A1* | 11/2015 | Slusarczyk | B21D 22/20 72/370.21 |
| 2016/0223045 A1* | 8/2016 | Baldoni | B60G 15/062 |
| 2017/0009840 A1* | 1/2017 | Hertz | F16F 9/49 |
| 2017/0314636 A1* | 11/2017 | Grzesik | F16F 9/3482 |
| 2018/0163813 A1* | 6/2018 | Chyla | F16F 9/19 |
| 2018/0195574 A1* | 7/2018 | Ishimaru | F16F 9/49 |
| 2019/0162266 A1* | 5/2019 | Flacht | F16F 9/18 |
| 2020/0025273 A1* | 1/2020 | Bergesio | F16F 9/36 |
| 2021/0131519 A1* | 5/2021 | Mallin | F16F 9/185 |
| 2021/0207678 A1* | 7/2021 | Bielak, II | F16F 9/34 |
| 2021/0404528 A1* | 12/2021 | Kasprzyk | F16F 9/185 |
| 2022/0213946 A1* | 7/2022 | Kontny | F16F 9/49 |

FOREIGN PATENT DOCUMENTS

| | | | |
|---|---|---|---|
| CN | 112879478 A * | 6/2021 | F16F 9/185 |
| DE | 102014223480 A1 | 5/2016 | |
| DE | 102017216550 A1 | 3/2019 | |
| DE | 102019211385 B4 | 3/2021 | |
| EP | 0565832 B1 | 4/1995 | |
| EP | 2302252 A1 | 3/2011 | |
| EP | 2302252 B1 | 11/2012 | |
| EP | 2952775 B1 | 9/2019 | |
| JP | 08291839 A | 11/1996 | |
| JP | 2016098895 A | 5/2016 | |
| WO | 2019145547 A1 | 8/2019 | |

OTHER PUBLICATIONS

The First Office Action and search report issued on May 26, 2023 for counterpart Chinese patent application No. 202210117424.0, along with machine EN translation downloaded from EPO.

* cited by examiner

HYDRAULIC REBOUND STOP FOR MONOTUBE DAMPER

CROSS REFERENCE TO RELATED APPLICATIONS

This U.S. utility patent application claims priority to Chinese Patent Application No. 202210117424.0 filed on Feb. 8, 2022, the contents of which are incorporated herein by reference in its entirety.

BACKGROUND OF THE INVENTION

1. Field of the Invention

The present invention generally relates to a damper assembly for a vehicle.

2. Description of the Prior Art

Damper assemblies are well known in the art for use in a vehicle. One such a damper assembly is disclosed in Patent publication U.S. Pat. No. 5,706,920A which discloses a monotube damper assembly including a main tube disposed on a center axis and extending between a first end and a second end. The damper defines a fluid compartment between the first end and the second end for containing a working fluid. A main piston is slidably disposed in the fluid compartment dividing the fluid compartment into a rebound compartment and a compression compartment. A piston rod is disposed on the center axis extending along the center axis to a distal end and attached to the main piston for moving the main piston between a compression stroke and a rebound stroke.

In some designs, a damper assembly may provide enhanced damping properties using a hydraulic rebound stop arrangement that generates additional damping force over a predefined end section of an operating travel range of the piston rod. Exemplary dampers provided with such hydraulic rebound stop arrangements are disclosed in patent publications EP2302252B1 and EP2952775B1. These hydraulic rebound stop arrangements permit progressive generation of additional damping force depending not only on a piston assembly position but also on its velocity within the predefined end section, which may be tunable.

However, such hydraulic stop arrangements may present challenges to manufacture and to retain components of the hydraulic rebound stop in a design location over the lifetime of the damper assembly, particularly when used with monotube damper assemblies.

SUMMARY OF THE INVENTION

The present invention provides a monotube damper assembly. The monotube damper assembly comprises: a housing defining a main compartment extending along a center axis between a first end and a second end; and a hydraulic rebound stop (HRS) assembly disposed within the housing adjacent to the first end and including an HRS sleeve having a tubular portion and a flange portion extending radially outwardly from the tubular portion at a first axial end thereof and configured to engage a corresponding ledge for locating the HRS assembly in the main compartment and preventing the HRS assembly from moving toward the second end, the tubular portion defining a plurality of recesses each extending axially from a second axial end of the tubular portion opposite the first axial end and having a depth that gradually decreases along a length of the tubular portion toward the flange portion.

The present invention also provides a hydraulic rebound stop (HRS) assembly for a monotube damper assembly. The HRS assembly comprises an HRS sleeve having a tubular portion and a flange portion extending radially outwardly from the tubular portion at a first axial end thereof and configured to engage a corresponding ledge for locating the HRS assembly within the monotube damper assembly, the tubular portion defining a plurality of recesses each extending axially from a second axial end of the tubular portion opposite the first axial end and having a depth that gradually decreases along a length of the tubular portion toward the flange portion.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
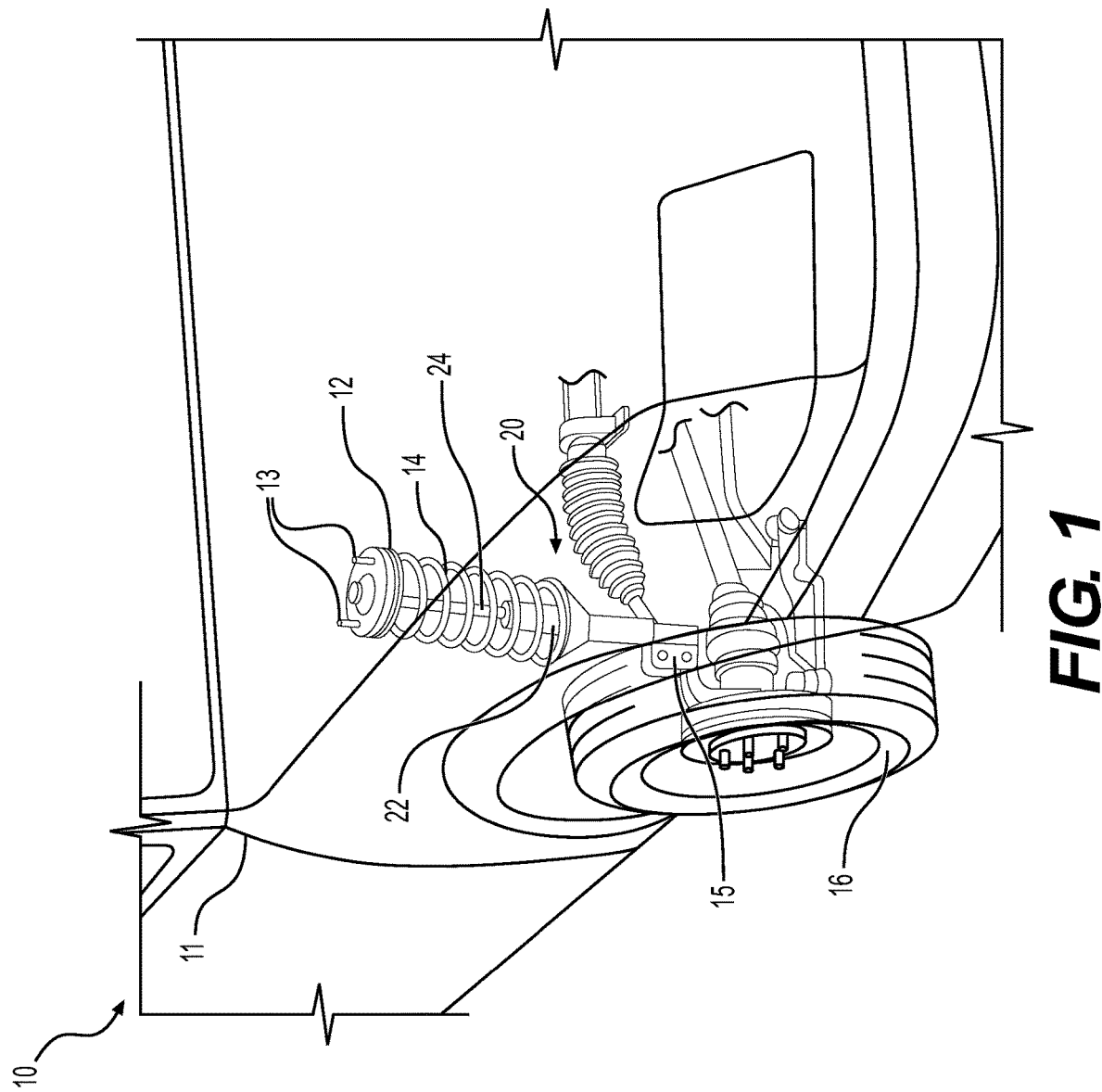
FIG. 1 shows a fragmentary view of a vehicle suspension including the damper assembly in accordance with the present invention.

Referring to the Figures, wherein like numerals indicate corresponding parts throughout the several views, it is one aspect of the present invention to provide a monotube damper assembly 20 for a vehicle 10. A generally illustrated in FIG. 1, the monotube damper assembly 20 is attached to a chassis 11 of the vehicle 10 by a top mount 12. A number of screws 13 extend through an upper surface of the top mount 12 to fasten the top mount 12 to a body of the vehicle 10. The top mount 12 is connected to a coil spring 14 and a rod 24 of the damper assembly 20. The monotube damper assembly 20 is also connected to a knuckle 15 supporting a wheel 16 of the vehicle 10.

Figure 2:
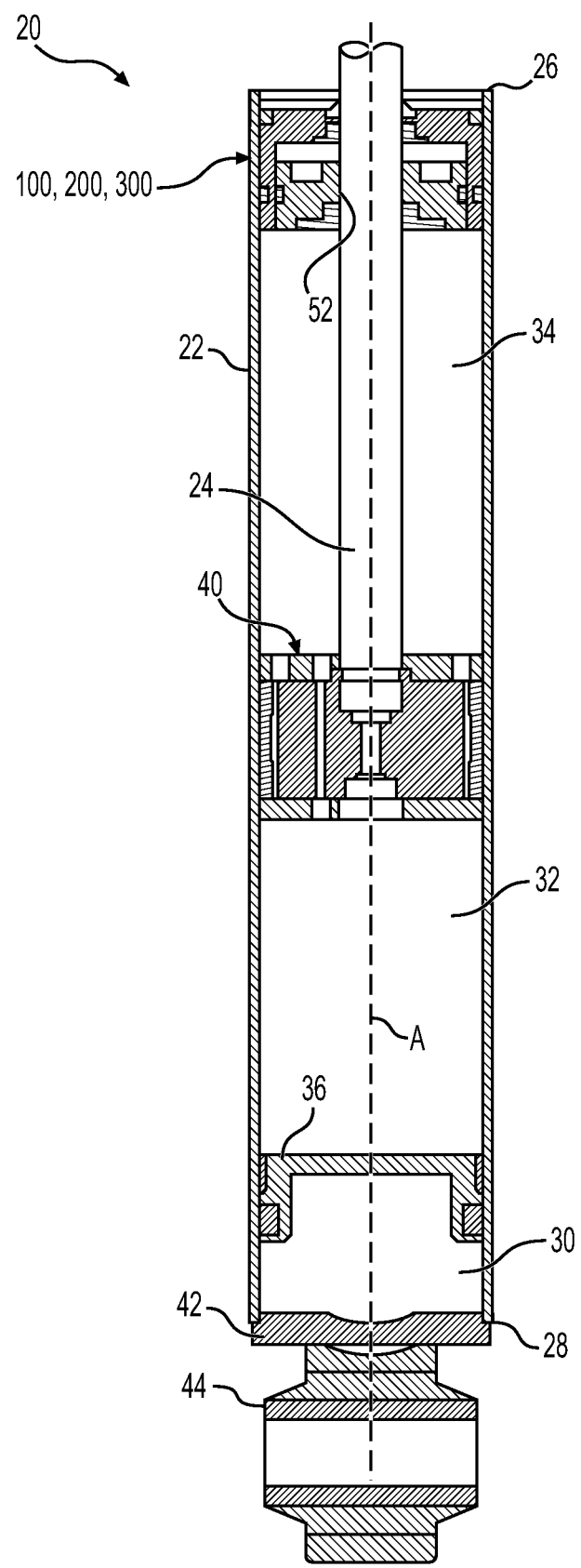
FIG. 2 shows a cross-sectional perspective view of the damper assembly.

As generally shown in FIG. 2, the monotube damper assembly 20 includes a housing 22 having a tubular shape extending along a center axis A between a first end 26 and a second end 28 and defining a main compartment 30, 32, 34 therein. The monotube damper assembly 20 also includes a gas cup 36 disposed in the main compartment 30, 32, 34 in sealing engagement with the housing 22 and slidable along the center axis A to divide the main compartment 30, 32, 34 into a gas compartment 30 for containing a gas and a fluid compartment 32, 34. The gas compartment 30 extends between the second end 28 and the gas cup 36, and the fluid compartment 32, 34 extends between the gas cup 36 and the first end 26.

The monotube damper assembly 20 also includes a piston 40 slidably disposed in the fluid compartment 32, 34 and dividing the fluid compartment 32, 34 into a compression compartment 32 and a rebound compartment 34. The compression compartment 32 extends between the piston 40 and the gas cup 36, and the rebound compartment 34 extends between the first end 26 and the piston 40.

The rod 24 extends along the center axis A and is attached to the piston 40 for moving the piston 40 within the housing 22. An end closure 42 seals the gas compartment 30 at the second end 28 of the housing 22. A damper mount 44 is attached to the end closure 42 and configured to attach the monotube damper assembly 20 to a body of a vehicle 10 through a connecting component, such as the top mount 12. The monotube damper assembly 20 of the present disclosure may be used in other configurations and/or orientations. For example, the damper mount 44 may connect the housing 22 of the monotube damper assembly 20 to a chassis component of the vehicle 10.

The monotube damper assembly 20 also includes a rod end assembly 100, 200, 300 disposed adjacent to the first end 26 of the housing 22 to enclose the rebound compartment 34. The rod end assembly 100, 200, 300 defines a bore 52 for the rod 24 to pass through.

Figure 3:
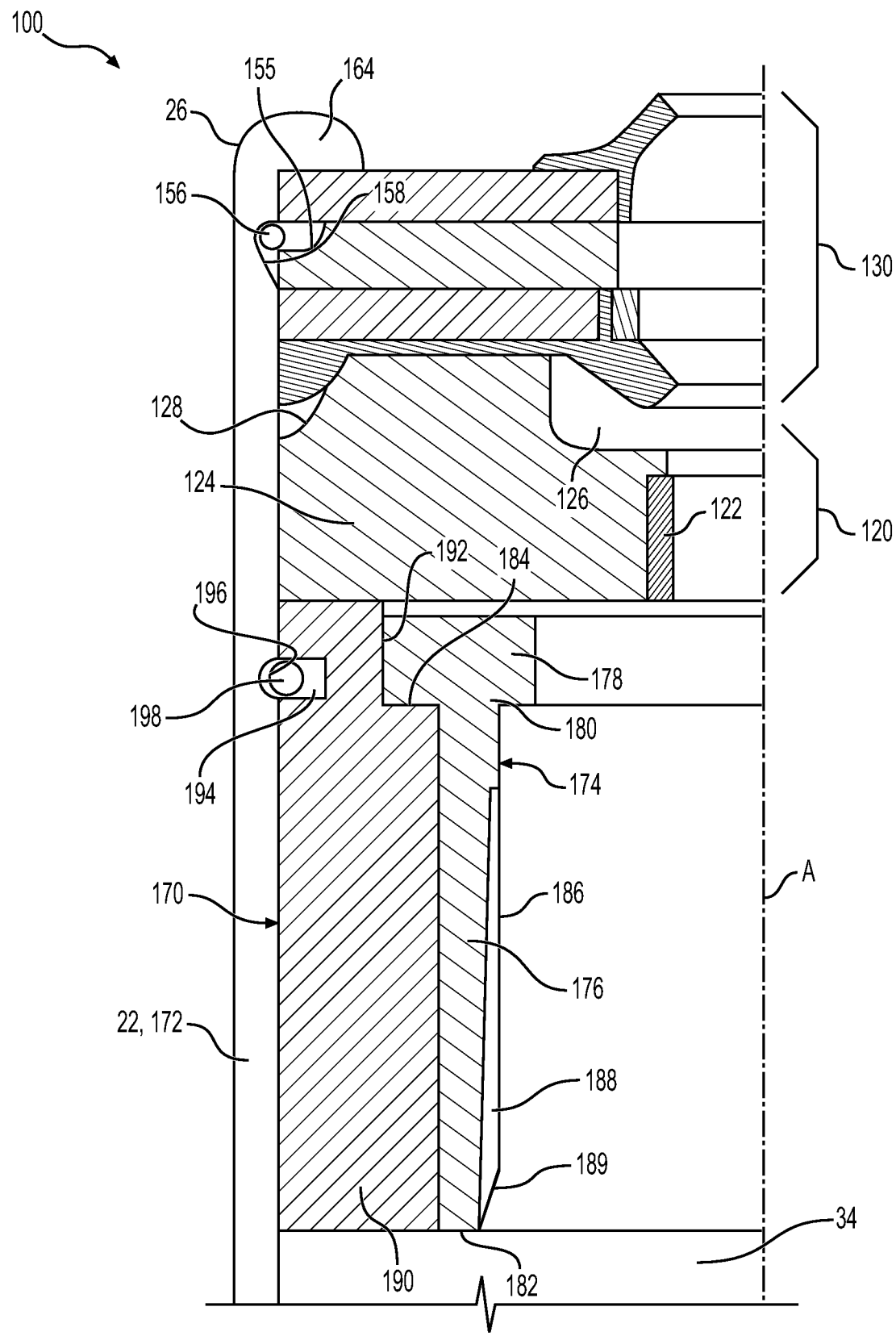
FIG. 3 shows an enlarged cross-sectional fragmentary view of a first rod end assembly for a monotube damper, according to an aspect of the present disclosure.
Figure 4:
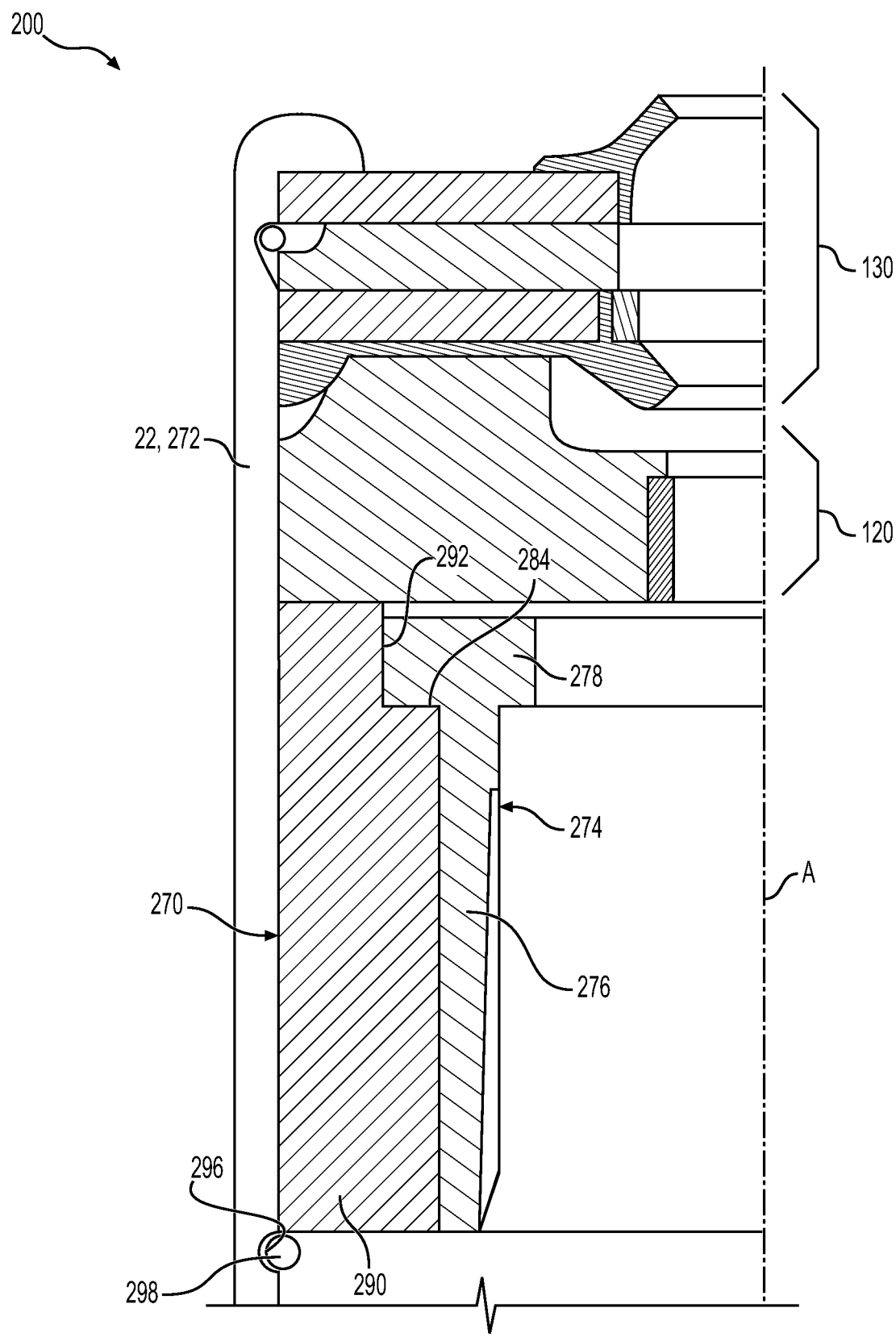
FIG. 4 shows an enlarged cross-sectional fragmentary view of a second rod end assembly for a monotube damper, according to an aspect of the present disclosure.
Figure 5:
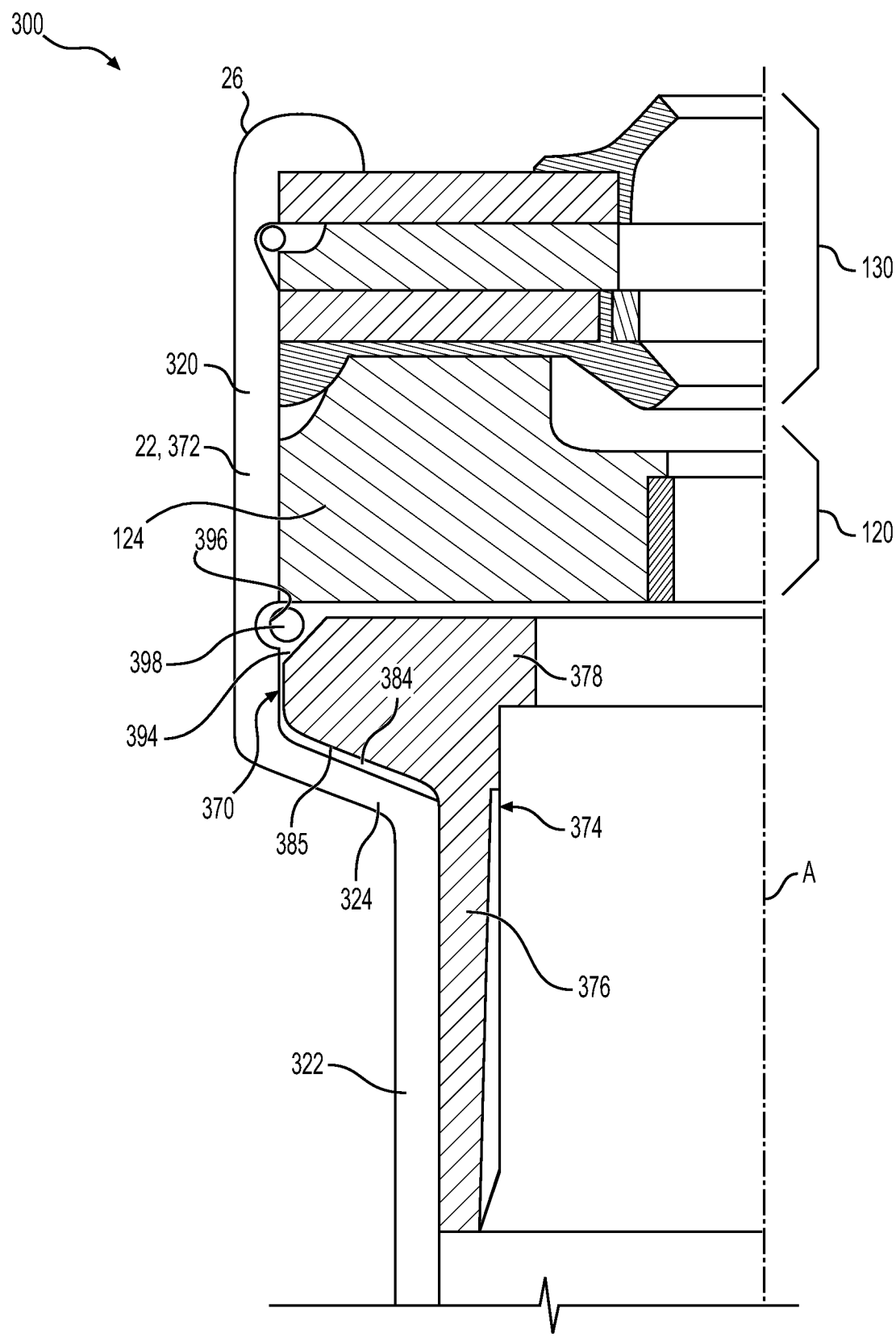
FIG. 5 shows an enlarged cross-sectional fragmentary view of a third rod end assembly for a monotube damper, according to an aspect of the present disclosure.

FIGS. 3-5 each show a corresponding alternative embodiment of the rod end assembly 100, 200, 300 of the monotube damper assembly 20. FIG. 3 shows an enlarged cross-sectional fragmentary view of a first rod end assembly 100 of the monotube damper assembly 20.

As shown in FIG. 3, the first rod end assembly 100 includes a rod guide 120 configured to support the rod 24 coaxially with the housing 22. The rod guide 120 includes a guide bushing 122 and a guide support 124 configured to hold the guide bushing 122 contacting the rod 24. The guide bushing 122 has a tubular shape may be made of a rigid material for slidably engaging the rod 24. For example, the guide bushing 122 may be made of steel or bronze. The guide support 124 defines an upper cup 126 having a generally rectangular cross-section centered around the center axis A. The guide support 124 also defines an annular bevel 128 located about an upper and outer circumference thereof, facing toward the first end 26 of the housing 22.

The first rod end assembly 100 also includes a seal assembly 130 configured to prevent fluid from leaking out of the fluid compartment 32, 34 as the rod 24 translates into and out of the fluid compartment 32, 34. The seal assembly 130 defines a first retainer slot 155 circumferentially thereabout for receiving a first retainer ring 156. The housing 22 defines a first annular groove 158 configured to receive the first retainer ring 156 to hold the seal assembly 130 within the housing 22. The housing 22 defines a roll closure 164 at the first end 26, which extends radially inwardly and over the seal assembly 130 for holding the seal assembly 130 within the housing 22.

The first rod end assembly 100 shown in FIG. 3 also includes a first hydraulic rebound stop (HRS) assembly 170 disposed within the housing 22 adjacent to the rod guide 120. The first rod end assembly 100 is configured to cooperate with a first configuration 172 of the housing 22, shown in FIG. 3.

The first HRS assembly 170 includes a first HRS sleeve 174 having a first tubular portion 176 and a first flange portion 178. The first HRS sleeve 174 may be formed as a single-piece. The first FIRS sleeve 174 may be made of a composite material, although other materials may be used. The first tubular portion 176 has a tubular shape disposed coaxially with the housing 22 and including and extending between a first axial end 180 and a second axial end 182 opposite the first axial end 180. The first axial end 180 of the first tubular portion 176 faces toward the first end 26 of the housing 22. The first flange portion 178 of the first HRS sleeve 174 is located adjacent to the rod guide 120 and extends radially outwardly from the first tubular portion 176 at the first axial end 180 thereof. The first flange portion 178 is configured to engage a first corresponding ledge 184 to locate the first HRS assembly 170 in the rebound compartment 34 adjacent to the rod guide 120 and to prevent the first HRS assembly 170 from moving toward the second end 28. In some embodiments, and as shown in FIG. 3, the first flange portion 178 also extends radially inwardly from the first tubular portion 176.

The first tubular portion 176 includes an inner surface 186 that defines a plurality of recesses 188, each extending axially from the second axial end 182 and having a depth that gradually decreases along a length of the first tubular portion 176 toward first flange portion 178. In some embodiments, the plurality of recesses 188 may be spaced apart at regular angular intervals around the inner surface 186. In some embodiments, and as shown in FIG. 3, the inner surface 186 of the first tubular portion 176 defines a frustoconical portion adjacent to the second axial end 182 and extending radially inwardly and axially toward the first axial end 180.

The first HRS assembly 170 also includes a first HRS support ring 190 having a tubular shape and disposed between the housing 22 and the first HRS sleeve 174 along all or substantially all of an axial length of the first tubular portion 176 to support the first tubular portion 176 against outward fluid pressure. The first HRS support ring 190 may be made of a rigid material, such as steel. The first FIRS support ring 190 defines a first annular cavity 192 within an inner surface and an upper end thereof and adjacent to the rod guide 120. The first annular cavity 192 defines the first corresponding ledge 184 for engaging the first flange portion 178 of the first HRS sleeve 174.

The first HRS support ring 190 also defines a second retainer slot 194 that extends circumferentially thereabout and adjacent to the first annular cavity 192. The second retainer slot 194 is configured to receive a second retainer ring 196 for securing the first FIRS assembly 170 within the housing 22. The first configuration 172 of the housing 22 defines a second annular groove 198 configured to receive the second retainer ring 196 to hold the first HRS assembly 170 within the housing 22.

FIG. 4 shows an enlarged cross-sectional fragmentary view of a second rod end assembly 200 of the monotube damper assembly 20. The second rod end assembly 200 includes a rod guide 120, which may be similar or identical to the rod guide 120 of the first rod end assembly 100. The second rod end assembly 200 also includes a seal assembly 130, which may be similar or identical to the seal assembly 130 of the first rod end assembly 100. The second rod end assembly 200 also includes a second HRS assembly 270, which may be similar to the first FIRS assembly 170 of the first rod end assembly 100, except for a few differences described herein. The second rod end assembly 200 is configured to cooperate with a second configuration 272 of the housing 22, shown in FIG. 4.

The second HRS assembly 270 shown in FIG. 4 includes a second HRS sleeve 274, which may be similar or identical to the first HRS sleeve 174 of the first rod end assembly 100. The second HRS sleeve 274 includes a second tubular portion 276 and a second flange portion 278 connected thereto. The second flange portion 278 of the second HRS sleeve 274 is located adjacent to the rod guide 120 and extends radially outwardly from the second tubular portion 276 at a first axial end thereof. The second flange portion 278 is configured to engage a second corresponding ledge 284 to locate the second HRS assembly 270 in the rebound compartment 34 adjacent to the rod guide 120 and to prevent the second HRS assembly 270 from moving toward the second end 28. In some embodiments, and as shown in FIG. 4, the second flange portion 278 also extends radially inwardly from the second tubular portion 276.

The second HRS assembly 270 also includes a second HRS support ring 290 having a tubular shape and disposed between the housing 22 and the second HRS sleeve 274 along all or substantially all of an axial length of the second tubular portion 276 to support the second tubular portion 276 against outward fluid pressure. The second HRS support ring 290 may be made of a rigid material, such as steel. The second HRS support ring 290 defines a second annular cavity 292 within an inner surface and an upper end thereof and adjacent to the rod guide 120. The second annular cavity 292 defines the second corresponding ledge 284 for engaging the second flange portion 278 of the second HRS sleeve 274.

The second configuration 272 of the housing 22 defines a third annular groove 298 configured to receive a third retainer ring 296, with the third retainer ring 296 abutting a lower surface of the second HRS support ring 290 opposite the rod guide 120 to hold the second HRS assembly 270 within the housing 22.

FIG. 5 shows an enlarged cross-sectional fragmentary view of a third rod end assembly 300 of the monotube damper assembly 20. The third rod end assembly 300 includes a rod guide 120, which may be similar or identical to the rod guide 120 of the first rod end assembly 100. The third rod end assembly 300 also includes a seal assembly 130, which may be similar or identical to the seal assembly 130 of the first rod end assembly 100. The third rod end assembly 300 also includes a third HRS assembly 370, which may be similar to the first HRS assembly 170 of the first rod end assembly 100, except for a few differences described herein. The third rod end assembly 300 is configured to cooperate with a third configuration 372 of the housing 22, shown in FIG. 5.

The third HRS assembly 370 shown in FIG. 5 includes a third HRS sleeve 374, which may be similar or identical to the first FIRS sleeve 174 of the first rod end assembly 100. The third HRS sleeve 374 includes a third tubular portion 376 and a third flange portion 378 connected thereto. The third flange portion 378 of the third HRS sleeve 374 is located adjacent to the rod guide 120 and extends radially outwardly from the third tubular portion 376 at a first axial end thereof. The third flange portion 378 is configured to engage a third corresponding ledge 384 to locate the third HRS assembly 370 in the rebound compartment 34 adjacent to the rod guide 120 and to prevent the third HRS assembly 370 from moving toward the second end 28. In some embodiments, and as shown in FIG. 5, the third flange portion 378 also extends radially inwardly from the third tubular portion 376.

The third configuration 372 of the housing 22 includes a first tube portion 320 adjacent the first end 26 and a second tube portion 322 spaced apart from the first end 26 and having a smaller diameter than the first tube portion 320. The third configuration 372 of the housing 22 also includes a flared portion 324 joining the first tube portion 320 and the second tube portion 322. The flared portion defines the third corresponding ledge 384 for engaging the third flange portion 378 of the third HRS sleeve 374 to hold the third HRS assembly 370 within the housing 22.

In some embodiments, and as shown in FIG. 5, the third flange portion 378 of the third HRS sleeve 374 includes a sloping lower surface 385 that extends upwardly away from the third tubular portion 376 and radially outwardly for engaging the flared portion 324 of the housing 22.

In some embodiments, and as shown in FIG. 5, the housing 22 defines a fourth annular groove 396 configured to receive a fourth retainer ring 398, with the fourth retainer ring 398 abutting a lower surface of the guide support 124 to hold the rod guide 120 within the housing 22. In some embodiments, and as shown in FIG. 5, the third flange portion 378 of the third HRS sleeve 374 defines an annular slot 394 along an upper and outer corner thereof and configured to receive the fourth retainer ring 398. The annular slot 394 may provide clearance for the fourth retainer ring 398, thereby allowing the third HRS assembly 370 to mount flush against the lower surface of the guide support 124.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A monotube damper assembly comprising:
a housing defining a main compartment extending along a center axis between a first end and a second end; and
a hydraulic rebound stop (HRS) assembly disposed within the housing adjacent to the first end and including an HRS sleeve having a tubular portion and a flange portion extending radially outwardly from the tubular portion at a first axial end thereof and configured to engage a corresponding ledge for locating the HRS assembly in the main compartment and preventing the HRS assembly from moving toward the second end, the tubular portion defining a plurality of recesses each extending axially from a second axial end of the tubular portion opposite the first axial end and having a depth that gradually decreases along a length of the tubular portion toward the flange portion, wherein the flange portion of the HRS sleeve further extends radially inwardly from the tubular portion.

2. The monotube damper assembly of claim 1, further comprising: an HRS support ring having a tubular shape and disposed between the housing and the HRS sleeve, the HRS support ring defining an annular cavity within an inner surface thereof, the annular cavity defining the corresponding ledge for engaging the flange portion of the HRS sleeve.

3. The monotube damper assembly of claim 2, wherein the HRS support ring defines a retainer slot circumferentially thereabout and adjacent to the annular cavity and configured to receive a retainer ring, the housing defining an annular groove configured to receive the retainer ring to hold the HRS assembly within the housing.

4. The monotube damper assembly of claim 2, wherein the housing defines an annular groove configured to receive a retainer ring, with the retainer ring abutting a lower surface of the HRS support ring to hold the HRS assembly within the housing.

5. The monotube damper assembly of claim 1, wherein the housing includes a first tube portion adjacent the first end and a second tube portion spaced apart from the first end and having a smaller diameter than the first tube portion; and the housing includes a flared portion joining the first tube portion and the second tube portion, the flared portion defining the corresponding ledge for engaging the flange portion of the HRS sleeve to hold the HRS assembly within the housing.

6. The monotube damper assembly of claim 5, wherein the flange portion of the HRS sleeve includes a sloping lower surface extending upwardly away from the tubular portion and radially outwardly for engaging the flared portion of the housing.

7. The monotube damper assembly of claim 5, further comprising:
a piston slidably disposed in the housing;
a rod extending along a center axis of the housing and attached to the piston for moving the piston within the housing;
a rod guide configured to support the rod coaxially with the housing, the rod guide including a guide bushing and a guide support configured to hold the guide bushing contacting the rod; and
the housing defining an annular groove configured to receive a retainer ring, with the retainer ring abutting a lower surface of the guide support to hold the rod guide within the housing.

8. The monotube damper assembly of claim 7, wherein the flange portion of the HRS sleeve further defines an annular slot along an upper and outer corner thereof and configured to receive the retainer ring.

9. The monotube damper assembly of claim 1, further comprising:
a piston slidably disposed in the housing;
a rod extending along a center axis of the housing and attached to the piston for moving the piston within the housing; and
a rod end assembly disposed adjacent to the first end of the housing and defining a bore for the rod to pass therethrough, the rod end assembly including a rod guide configured to support the rod coaxially with the housing, the rod guide including a guide bushing and a guide support configured to hold the guide bushing contacting the rod, the guide bushing having a tubular shape and being made of a rigid material for slidably engaging the rod.

10. The monotube damper assembly of claim 1, further comprising: a rod end assembly disposed adjacent to the first end of the housing and defining a bore for a rod to pass therethrough, the rod end assembly including a seal assembly configured to prevent fluid from leaking as the rod translates through the rod end assembly.

11. The monotube damper assembly of claim 1, wherein the flange portion of the HRS sleeve is ring-shaped.

12. A hydraulic rebound stop (HRS) assembly for a monotube damper assembly, comprising: an HRS sleeve having a tubular portion and a flange portion extending radially outwardly from the tubular portion at a first axial end thereof and configured to engage a corresponding ledge for locating the HRS assembly within the monotube damper assembly, the tubular portion defining a plurality of recesses each extending axially from a second axial end of the tubular portion opposite the first axial end and having a depth that gradually decreases along a length of the tubular portion toward the flange portion, wherein the flange portion of the HRS sleeve further extends radially inwardly from the tubular portion.

13. The hydraulic rebound stop assembly of claim 12, further comprising: an HRS support ring having a tubular shape and disposed annularly around the HRS sleeve, the HRS support ring defining an annular cavity within an inner surface thereof, the annular cavity defining the corresponding ledge for engaging the flange portion of the HRS sleeve.

14. The hydraulic rebound stop assembly of claim 13, wherein the HRS support ring defines a retainer slot circumferentially thereabout and adjacent to the annular cavity and configured to receive a retainer ring for holding the HRS support ring within a housing of the monotube damper.

15. The hydraulic rebound stop assembly of claim 12, wherein the tubular portion is configured to extend along and adjacent to an inner surface of a housing of the monotube damper.

16. The hydraulic rebound stop assembly of claim 12, wherein the flange portion of the HRS sleeve is ring-shaped.

17. A monotube damper assembly comprising:
a housing defining a main compartment extending along a center axis between a first end and a second end; and
a hydraulic rebound stop (HRS) assembly disposed within the housing adjacent to the first end and including an HRS sleeve having a tubular portion and a flange portion extending radially outwardly from the tubular portion at a first axial end thereof and configured to engage a corresponding ledge for locating the HRS assembly in the main compartment and preventing the HRS assembly from moving toward the second end, the tubular portion defining a plurality of recesses each extending axially from a second axial end of the tubular portion opposite the first axial end and having a depth that gradually decreases along a length of the tubular portion toward the flange portion,
wherein the monotube damper assembly further comprises: an HRS support ring having a tubular shape and disposed between the housing and the HRS sleeve, the HRS support ring defining an annular cavity within an inner surface thereof, the annular cavity defining the corresponding ledge for engaging the flange portion of the HRS sleeve.

18. The monotube damper assembly of claim 17, wherein the HRS support ring defines a retainer slot circumferentially thereabout and adjacent to the annular cavity and configured to receive a retainer ring, the housing defining an annular groove configured to receive the retainer ring to hold the HRS assembly within the housing.

19. The monotube damper assembly of claim 17, wherein the housing defines an annular groove configured to receive a retainer ring, with the retainer ring abutting a lower surface of the HRS support ring to hold the HRS assembly within the housing.

* * * * *